(12) United States Patent
Stapleton

(10) Patent No.: US 9,057,545 B2
(45) Date of Patent: Jun. 16, 2015

(54) SOLAR PANEL ROOF MOUNTING BRACKET AND RELATED METHODS

(71) Applicant: Kevin Stapleton, San Antonio, TX (US)

(72) Inventor: Kevin Stapleton, San Antonio, TX (US)

( * ) Notice: Subject to any disclaimer, the term of this patent is extended or adjusted under 35 U.S.C. 154(b) by 0 days.

(21) Appl. No.: 14/279,799

(22) Filed: May 16, 2014

(65) Prior Publication Data

US 2014/0338273 A1 Nov. 20, 2014

Related U.S. Application Data

(60) Provisional application No. 61/824,146, filed on May 16, 2013.

(51) Int. Cl.
| | |
|---|---|
| *E04D 13/18* | (2014.01) |
| *E04H 14/00* | (2006.01) |
| *F24J 2/52* | (2006.01) |

(52) U.S. Cl.
CPC ............ *F24J 2/5249* (2013.01); *F24J 2/5245* (2013.01); *F24J 2/526* (2013.01); *Y02B 10/20* (2013.01); *Y02E 10/47* (2013.01)

(58) Field of Classification Search
CPC ......... F24J 2/5249; F24J 2/5245; F24J 2/526; Y05B 10/20; Y02E 10/47
USPC ............ 52/173.3, 24, 25, 26, 506.05, 206.06; 248/200, 220.21, 220.22, 222.11, 248/228.1, 228.5
See application file for complete search history.

(56) References Cited

U.S. PATENT DOCUMENTS

| | | | | |
|---|---|---|---|---|
| 5,121,583 A | * | 6/1992 | Hirai et al. ...................... | 52/90.1 |
| 5,706,617 A | * | 1/1998 | Hirai et al. ..................... | 52/173.3 |
| 6,158,186 A | * | 12/2000 | Feller .......................... | 52/506.06 |
| 7,963,074 B2 | | 6/2011 | Schwarze et al. | |
| 8,181,402 B2 | * | 5/2012 | Tsuzuki et al. ............... | 52/173.3 |
| 8,776,456 B1 | * | 7/2014 | Schrock ........................ | 52/173.3 |
| 8,794,583 B2 | * | 8/2014 | Poivet et al. ................... | 248/500 |
| 8,806,813 B2 | * | 8/2014 | Plaisted et al. ................ | 52/173.3 |
| 8,833,015 B2 | * | 9/2014 | Bilge ............................... | 52/235 |

(Continued)

OTHER PUBLICATIONS

"ACECLAMP JR Technical Datasheet": pub 100602-1td V1.0 6/10 http://unirac.com/sites/default/files/aceclampdatasheetjune2010. pdf: 3 pgs.

(Continued)

*Primary Examiner* — Brian Glessner
*Assistant Examiner* — Brian D Mattei
(74) *Attorney, Agent, or Firm* — Allen, Dyer, Doppelt, Milbrath & Gilchrist, P.A.

(57) ABSTRACT

A system for mounting at least one solar panel on a roof may include a plurality of panel mounting brackets each including a base to be positioned on the roof having a first opening(s) therein, and a vertical extension having a proximal end coupled to the base, a distal end, and a central portion extending between the proximal and distal ends. The distal end may define a fastener channel having a fastener slot opening vertically aligned with the first opening(s) in the base. The central portion may include a cross member(s) defining a second opening(s) therein vertically aligned with the fastener slot opening and the first opening(s) in the base. The system may further include a bracket fastener(s) to be inserted through the fastener slot opening, the second opening(s), and the first opening(s) of a respective panel mounting bracket and coupled to the roof.

20 Claims, 9 Drawing Sheets

(56) References Cited

U.S. PATENT DOCUMENTS

| | | | | |
|---|---|---|---|---|
| 2002/0035811 A1* | 3/2002 | Heuel | | 52/506.05 |
| 2003/0070368 A1* | 4/2003 | Shingleton | | 52/173.3 |
| 2012/0260977 A1 | 10/2012 | Stancel | | |
| 2012/0275844 A1* | 11/2012 | Kobayashi | | 403/7 |
| 2014/0137489 A1* | 5/2014 | Habdank et al. | | 52/173.3 |

OTHER PUBLICATIONS

"S-5 The Right Way" http://www.s-5.com/home/index.cfm; 2 pgs, printed Oct. 17, 2013.

"S-5 The Right Way" http://www.s-5.com/clamps/index_1048.cfm: 1 pg, printed Oct. 17, 2013.

U.S. Appl. No. 14/056,209, filed Oct. 17, 2013.

* cited by examiner

SOLAR PANEL ROOF MOUNTING BRACKET AND RELATED METHODS

TECHNICAL FIELD

The present disclosure generally relates to mounting fixtures, and, more particularly, to mounting fixtures or brackets for panel installations, such as for solar panels, for example, to standing seam metal rooftops.

BACKGROUND

Solar panels, such as photovoltaic (PV) and solar water heating panels, are frequently used to take advantage of electrical power generation and heating properties of sunlight. To provide space savings and potentially enhanced efficiency, solar panels are in many cases installed on rooftops of buildings (e.g., office buildings, houses, etc.). However, because of winds and storms, the mounting fixtures used for installing solar panels on buildings need to be sufficiently strong and durable to reduce the chances of damage or injury from a panel coming loose during a storm, etc.

Various mounting fixtures have been developed for solar panel installation. For example, U.S. Pat. No. 7,963,074 discloses a device for fixing a photovoltaic module on a sloping roof having a roof structure and a roof covering with individual roof covering elements. The device includes a roof-side connecting piece disposable beneath the roof covering and a module-side connecting piece disposable on an edge of the photovoltaic module. A flexible retaining element interconnects the roof-side connecting piece and the module-side connecting piece. The flexible retaining element is loadable by pulling and adapted to be guided through the roof covering without altering a position or shape of the individual roof covering elements.

Despite the existence of such mounting fixtures, further enhancements may be desirable in some applications.

SUMMARY

A system for mounting at least one solar panel on a roof may include a plurality of panel mounting brackets each including a base to be positioned on the roof having at least one first opening therein, and a vertical extension having a proximal end coupled to the base, a distal end, and a central portion extending between the proximal and distal ends. The distal end may define a fastener channel having a fastener slot opening vertically aligned with the at least one first opening in the base. The central portion may include at least one cross member defining at least one second opening therein vertically aligned with the fastener slot opening and the at least one first opening in the base. The system may further include at least one bracket fastener to be inserted through the fastener slot opening, the at least one second opening, and the at least one first opening of a respective panel mounting bracket and coupled to the roof. Furthermore, a plurality of clamps and corresponding clamp fasteners may be configured to couple the at least one solar panel with the fastener channel of a respective panel mounting bracket so that each clamp fastener is retained within the respective fastener channel and extends vertically upward through the fastener slot opening to the at least one solar panel.

The at least one first opening may comprise a plurality of spaced-apart first openings, the at least one second opening may comprise a plurality of second spaced-apart openings, and the at least one bracket fastener may comprise a plurality of bracket fasteners for each panel mounting bracket. Furthermore, the at least one cross member may comprise a plurality of cross members vertically spaced apart from one another.

The at least one first opening may comprise a central opening in the base, and the base may further define a plurality of peripheral openings laterally spaced apart from the central opening. The base may have a non-linear cross section, such as an arcuate cross section, for example. The base may have a bottom surface to be positioned on the roof, and each bracket may further include a pad coupled to the bottom surface.

A related panel mounting bracket, such as the one described briefly above, is also provided. A related method is for mounting at least one solar panel on a roof, which may include arranging a plurality of panel mounting brackets, such as the ones described briefly above, on the roof. The method may also include inserting at least one bracket fastener through the fastener slot opening, the at least one second opening, and the at least one first opening of a respective panel mounting bracket and coupling the bracket fastener to the roof, and coupling a plurality of clamps and corresponding clamp fasteners to the at least one solar panel so that each fastener is retained within the respective fastener channel and extends vertically upward through the fastener slot opening to the at least one solar panel.

DETAILED DESCRIPTION

The present description is made with reference to the accompanying drawings, in which exemplary embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements in different embodiments.

Figure 1:
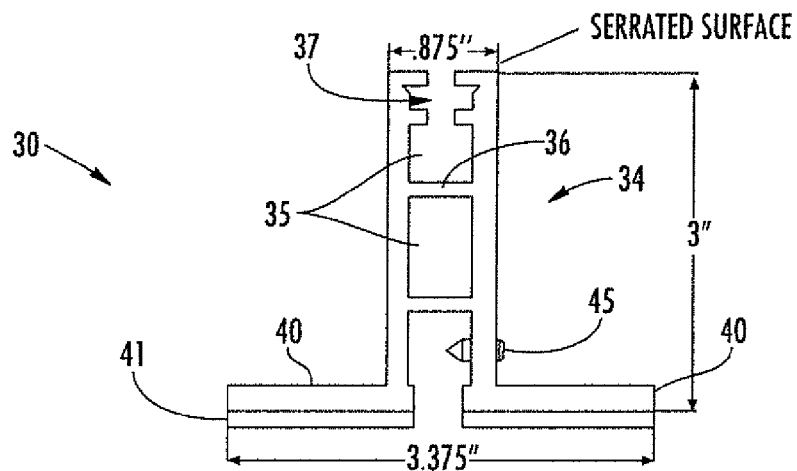
FIG. 1 is an end view of a panel mounting bracket in according with an exemplary embodiment of the invention including a set screw locking mechanism.
Figure 2:
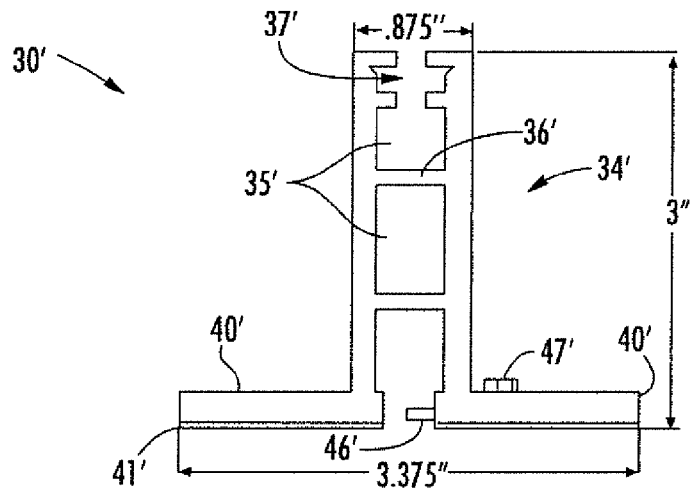
FIG. 2 is an end view of a panel mounting bracket in according with an alternative embodiment of the invention including a cam bolt locking mechanism.
Figure 3:
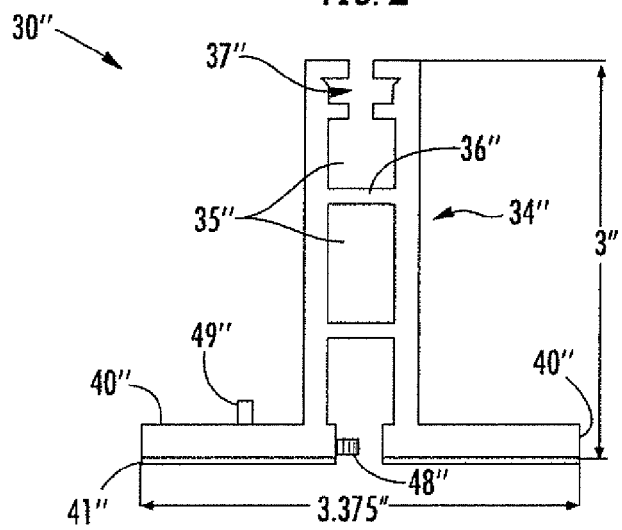
FIG. 3 is an end view of a panel mounting bracket in according with another alternative embodiment of the invention including a toothed locking cam mechanism.

Referring initially to FIGS. 1-8, mounting brackets 30, 30', and 30" (which are individually also referred to as a "foot" herein) for installing panels or modules 31, such as solar modules, is first described. By way of background, solar modules or panels are typically mounted to standing seam metal roofs 32, 32' 32" with clamps that tighten against the seam 33, 33' 33" alone but do not simultaneously rest on the flat portion of the metal roof. The mounting brackets 30, 30', and 30" illustrated in FIGS. 1 through 3 advantageously set firmly against the flat portion of a seemed roof 32, 32', 33" so as to remain perpendicular to the roof without rotating or twisting or allowing the solar modules 31, when installed, to shift as with typical clamps that are only attached to the standing seam 33, 33', 33" of the metal roof. The mounting brackets 30, 30', and 30" have a generally rectangular central vertical extension portion or rail 34, 34', 34" with a hollow central area or channel 35, 35', 35" therethrough defined by a plurality of cross members 36, 36', 36". An upper slot or groove 37, 37', 37" for attaching a clamp fastener, such as a bolt 38 (e.g., a hex head bolt) and/or nuts 39, is provided on the top of the mounting brackets 30, 30', and 30". It should be noted that the exemplary dimensions provided in FIGS. 1-3 are for illustrational purposes, and that other dimensions and brackets sizes may be used in different embodiments. The hollow channels 35, 35', 35" in the vertical upper rail portion 34, 34', 34" extend laterally therethrough, and may be used for routing electrical wiring, for example, if desired.

Flanges or extensions 40, 40', 40" at the bottom of the mounting brackets 30, 30', and 30", which define a base of the mounting brackets, extend outwardly away from the central portion 34, 34', 34" so as to sit flat on the rooftop or roof deck 32, 32' 32" upon installation. Serrations or other surface features (not shown) may optionally be included on the top and/or bottom of the central portion 34, 34', 34" (and flanges 40, 40', 40"), if desired. The serrations may advantageously provide for improved electrical grounding with the frame of the module 31, as well as increased grip or friction, for example. A pad 41, 41', 41" of rubber or other insulating material may optionally be included on the bottom of the flanges 40, 40', 40" to protect the standing seam metal roof 32, 32', 32" from being damaged by the flanges.

Figure 6:
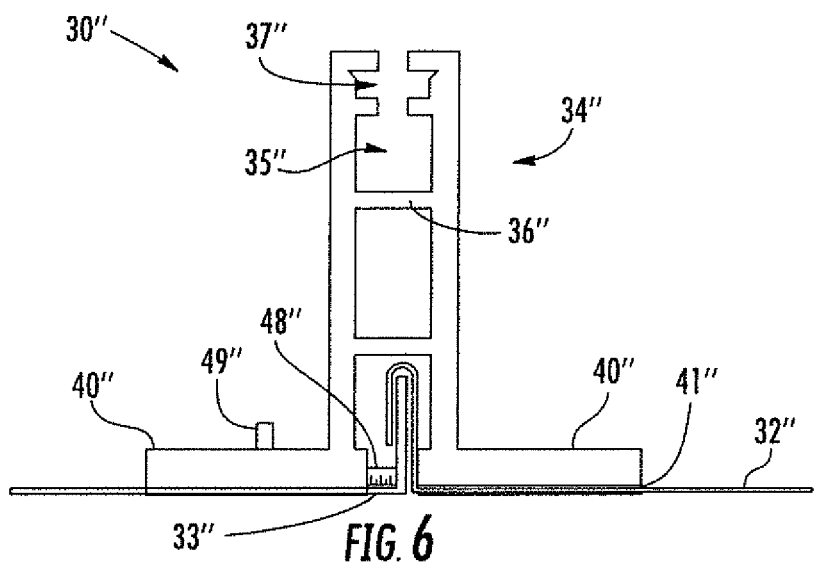
Figure 7:
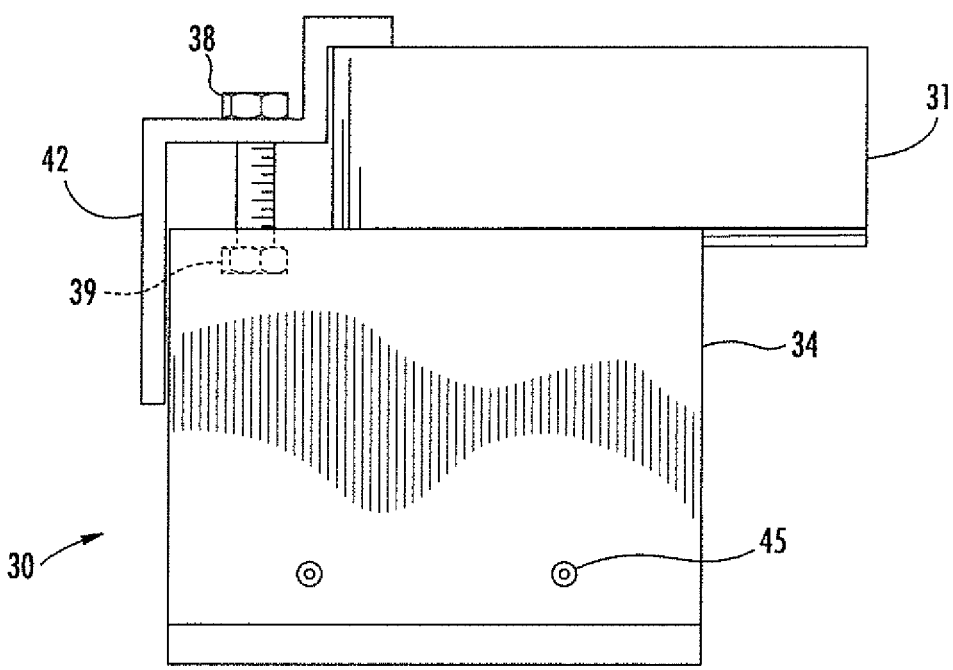
FIG. 7 is a side view of a solar panel installation with an end-clamp using the bracket of FIG. 1.
Figure 8:
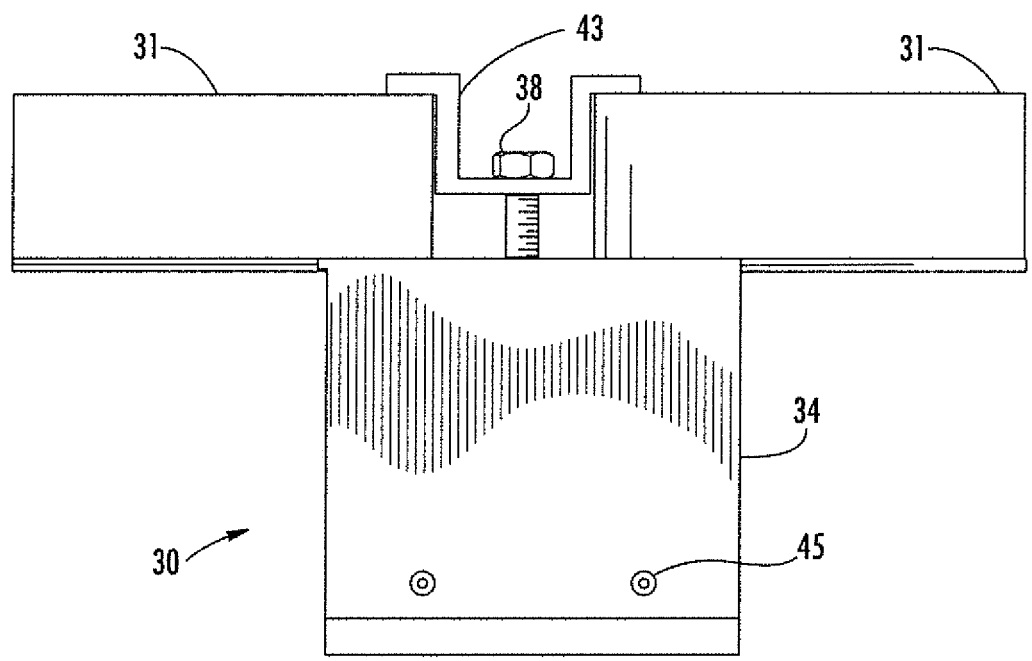
FIG. 8 is a side view of a panel installed with a mid-clamp using the bracket of FIG. 1.

In the illustrated example, the mounting brackets or feet 30, 30', and 30" clamp and hold the solar modules 31, 31', 31" via bolts 38 which screw downward through end and mid clamps 42, 43 into nuts located in the top rails, as seen in FIGS. 7 and 8, for example. For the bracket 30, set screws 45' carried by the vertical extension 34 secure the bracket to the standing seam 33 (see FIGS. 1 and 4). For the bracket 30' a locking cam 46', which is actuated via a cam bolt 47' is used to secure the bracket to the standing seam 33' (see FIGS. 2 and 5). Moreover, for the bracket 33" a toothed locking cam 48", which is actuated by a cam handle 49", is used to secure the bracket to the standing seam 33" (see FIGS. 3 and 6).

Figure 4:
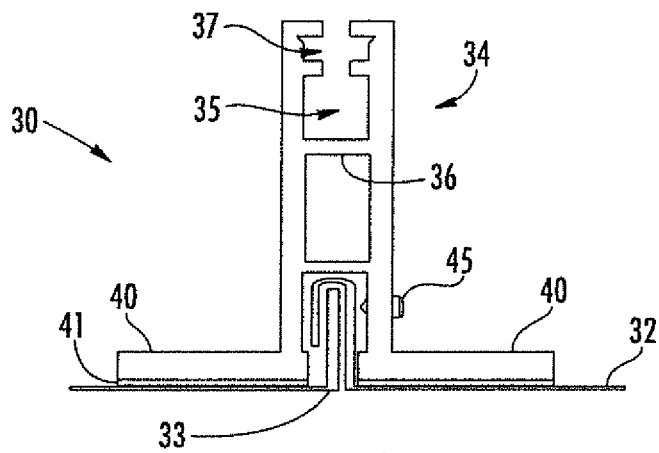
FIGS. 4-6 are end views illustrating the installation of the brackets of FIGS. 1-3, respectively, on a metal standing seam rooftop.
Figure 5:
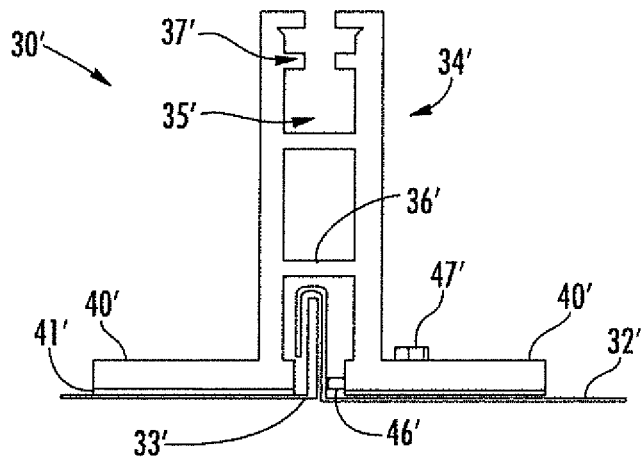
Figure 9:
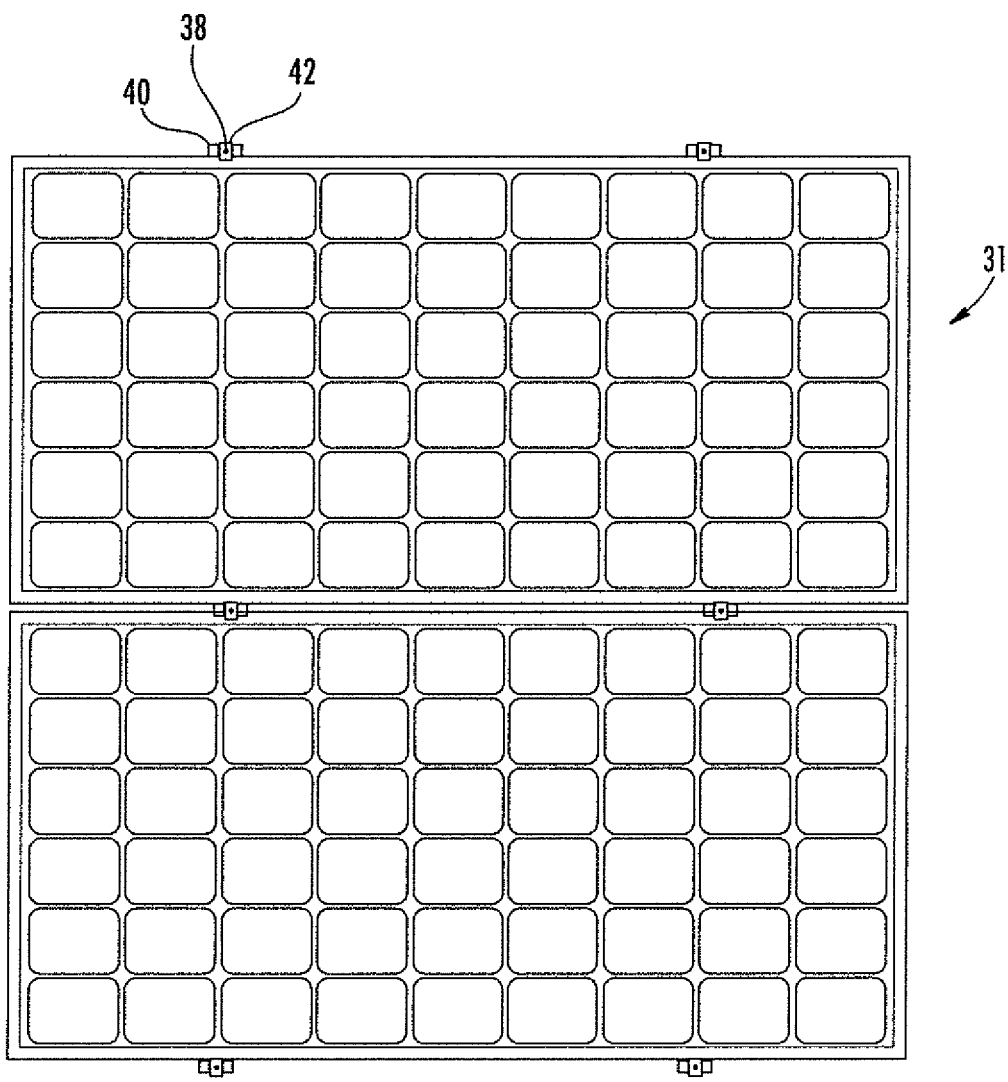
FIG. 9 is a top view illustrating solar panel installation using the bracket of FIG. 1.
Figure 10:
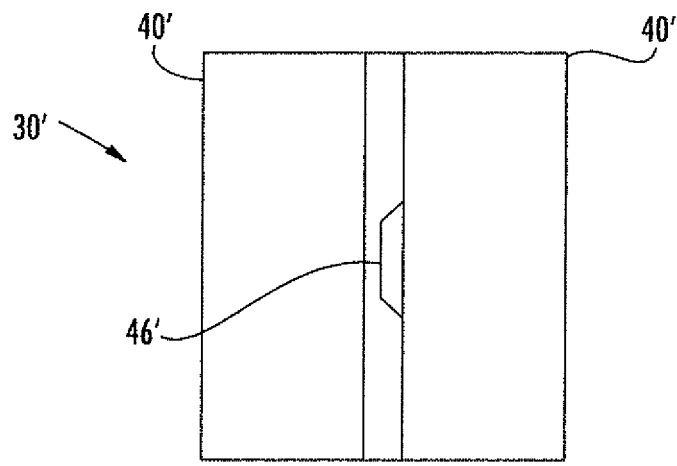
FIGS. 10-12 are bottom, side, and top views, respectively, of the mounting bracket of FIG. 2.
Figure 11:
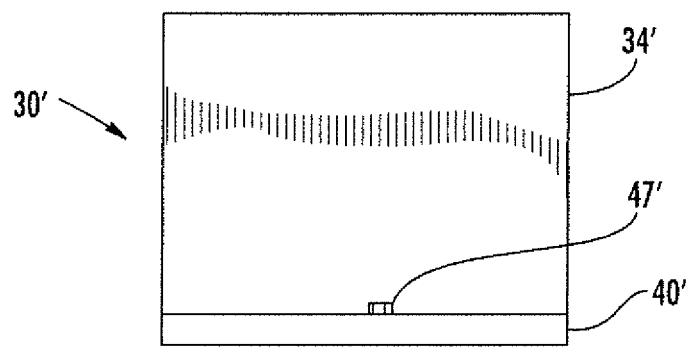
Figure 12:
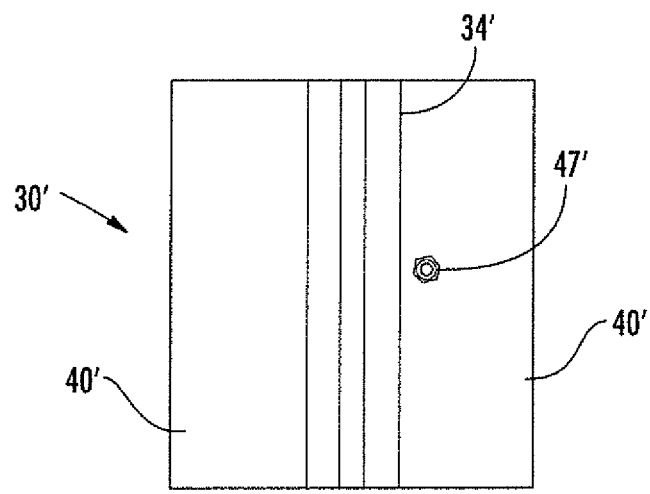
Figure 13:
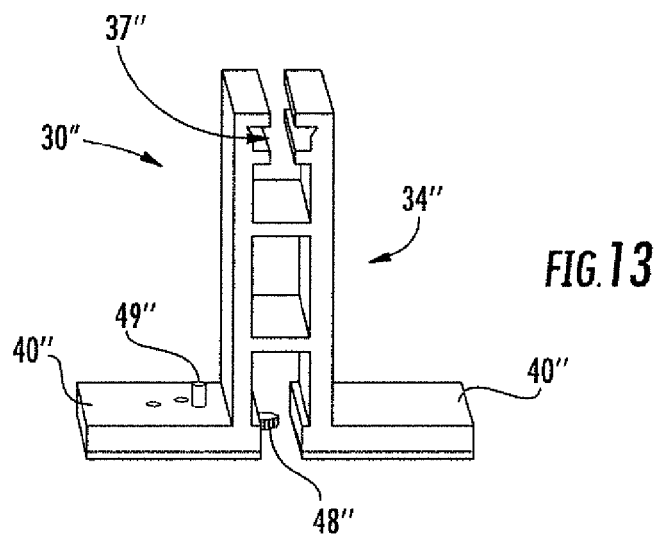
FIGS. 13-15 are end, bottom, and cutaway end views, respectively, of the mounting bracket of FIG. 3.
Figure 14:
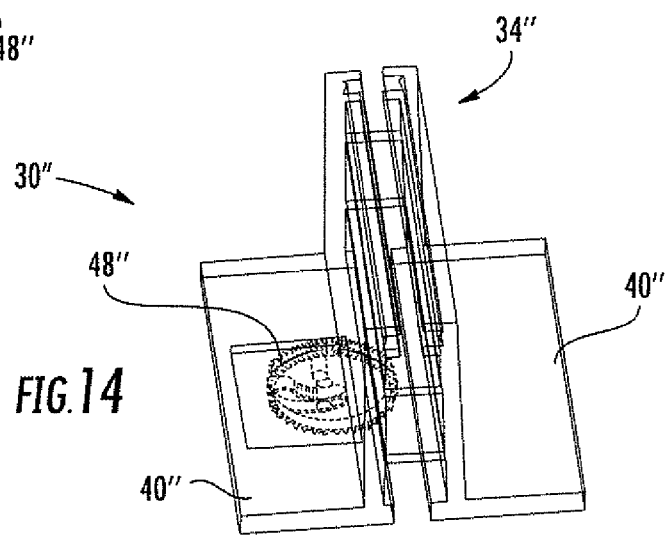
Figure 15:
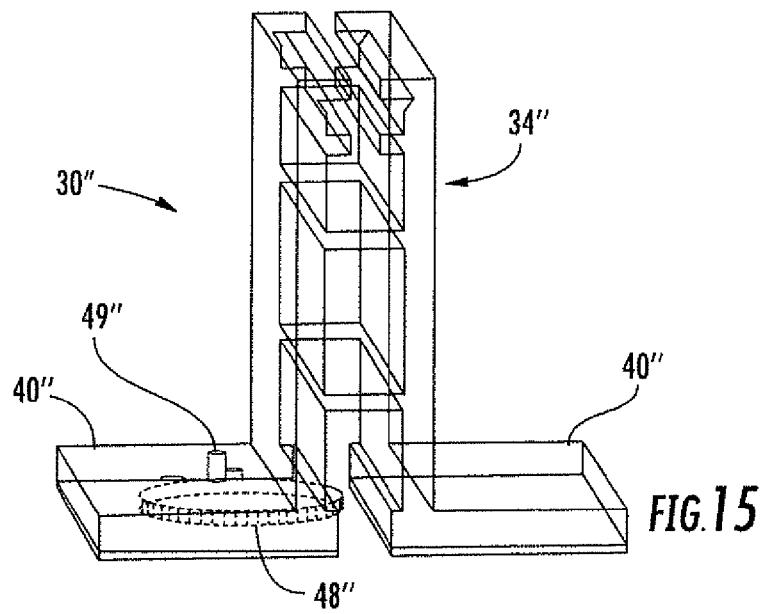

A first row of panels 30 (FIG. 9) may then be attached on the roof 32, 32', 32" by clamping to the existing standing seams 33, 33', 33" on standing seam metal roofs 32, 32', 32" as shown in FIGS. 4-6 for the mounting brackets 30, 30', and 30", respectively. Again, an end-clamp 42 may be used as demonstrated in FIG. 7. A next row of modules 31 may then be attached with additional mounting brackets 30, 30', or 30" on the bottom of the second row modules with a mid-clamp 43, as shown in FIG. 8. It should be noted that different mounting brackets 30, 30', and 30" may be used during an installation, that this, not all of the same type of mounting bracket need by used in a given installation, but rather they may be intermixed.

The above steps may be repeated for each row of modules 31 to be installed, until the last row of modules is in place. The last module 31 of each row may be attached to the mounting brackets 30, 30', and 30" using end-clamps 42 as discussed above.

It should be noted that the mounting brackets 30, 30', and 30" need not be hollow in all embodiments, and that different shapes beside a rectangular shape may also be used in some embodiments. Example materials for the foot 30, 30', 30" may include aluminum, which may be extruded into the desired shape, although other suitable materials may also be used in different embodiments. For example, composite materials (e.g., fiber-reinforced polymer, etc.) may be used in some applications, which may also provide an added benefit with respect to electrical grounding, for example. The various locking mechanisms may be made of metal components, such as stainless steel, aluminum, etc.

It should also be noted that the above-described mounting feet or brackets 30, 30', 30" may be used with a variety of standing seam profiles.

Figure 16:
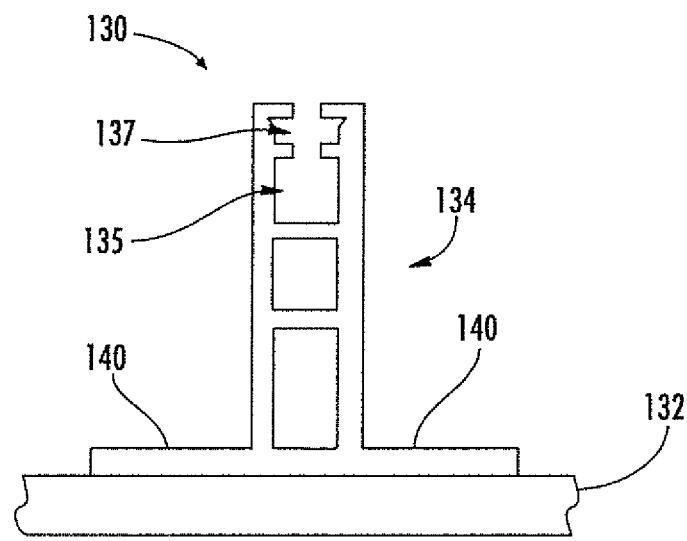
FIGS. 16-17 are side and top views, respectively, of another exemplary embodiment of a panel mounting bracket.
Figure 17:
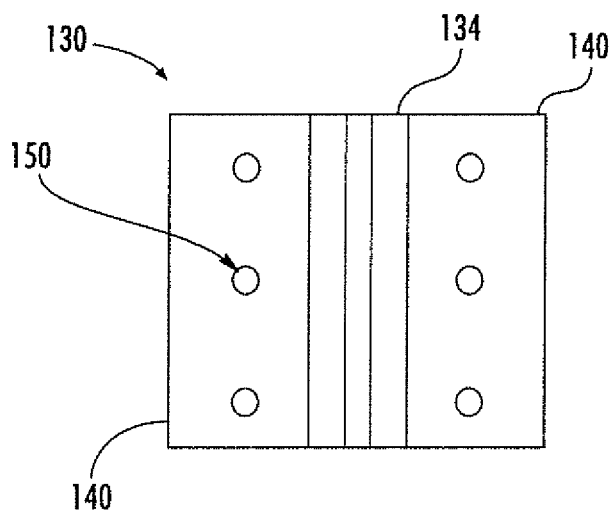

Referring additionally to FIGS. 16-17, in addition to being used for standing seam metal roofs as described above, the same part can be used with or without a chamfer in the base to mount solar panels 31 to flush mount roofs 132 by attaching them to the decking with decking screws (not shown) through mounting holes 150 on each side of the vertical upper rail 134 of the mount. As before, the vertical extension or rail 134 defines hollow channels 135 therein and an upper slot 137, and the base includes flanges 140. As a result, the bracket 130 may be more versatile than typical brackets, as it may be used for both standing seam metal roofs (when a chamfer is used) and flush mount roof applications. More particularly, the bracket 130 may be used for composition shingle mount roofs, flat roofs, and sheet metal roofs with screws or other suitable mounting hardware (e.g., bolts, etc.) designed for such decking, for example.

Figure 18:
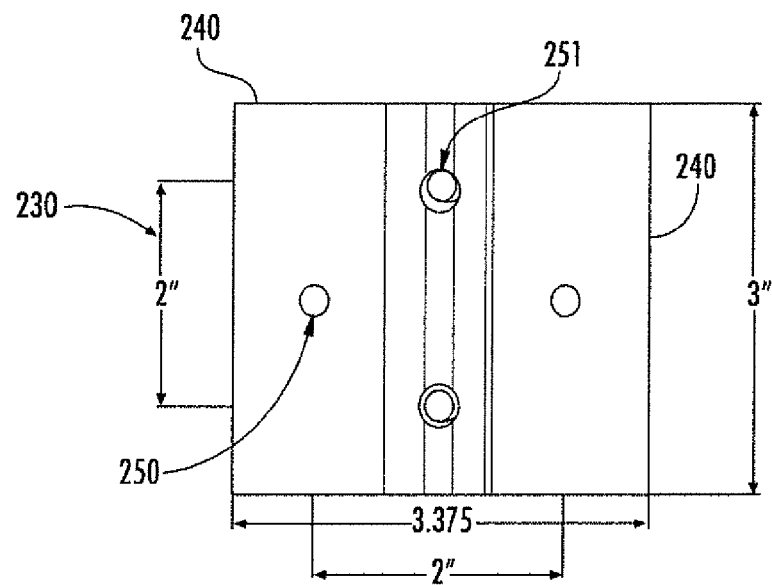
FIGS. 18-20 are top, side, and perspective views, respectively, of another exemplary embodiment of a panel mounting bracket which includes holes for providing rafter connections.
Figure 19:
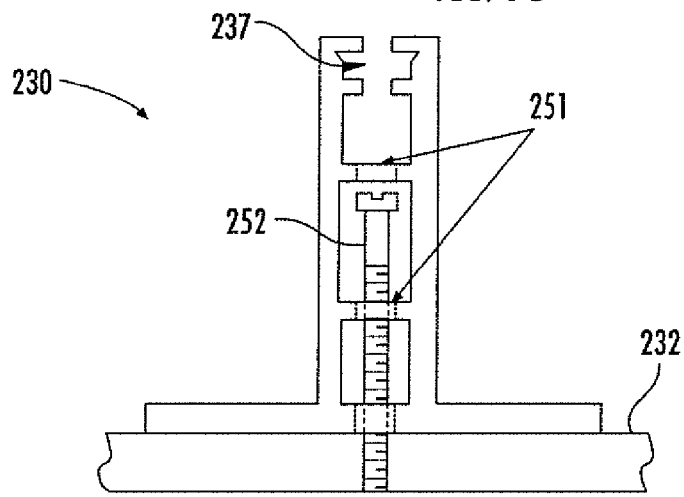
Figure 20:
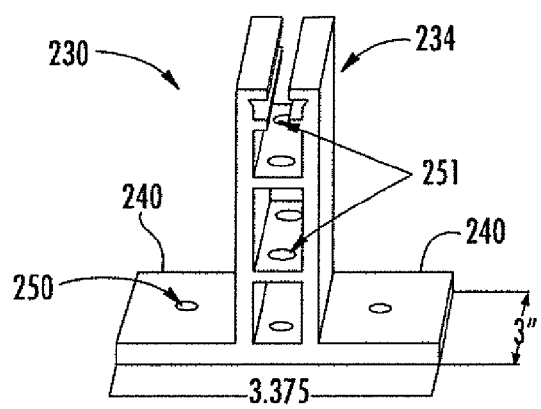

Another example embodiment of a bracket 230 without the standing seam chamfer is shown in FIG. 18. The bracket 230 has central holes or openings 251 drilled or formed in the center of the vertical upper rail portion for centering them over roof rafters for mounting with longer wood screws 252. While it may typically be easier to install a bracket 230 using only decking screws through holes 250 in the flanges 240 to either side of the vertical upper rail portion 234, some local building codes may require that solar fixtures be secured to trusses or rafters, as opposed to roof decking 232 alone, and the rafter screw holes may be used in such jurisdictions. Decking screws (not shown) may still be installed through peripheral mounting holes 250 in each flange 240 to provide added strength and stability, if desired. Accordingly, in different embodiments, holes 251, 250 for respective rafter screws 252 or decking screws, or both, may be provided on the bracket 230, with or without a chamfer for a standing seam. Moreover, different numbers of rafter screw holes 251 and decking screw holes 250 may be used in different embodiments. As with the above-described embodiments, the vertical extension 234 also illustratively includes an upper slot 237.

It should be noted that other base shapes besides those shown in the illustrated examples noted above may also be used. For example, instead of a generally rectangular/square shape, the base may take other shapes such as a circle, oval, polygon, etc.

Figure 21:
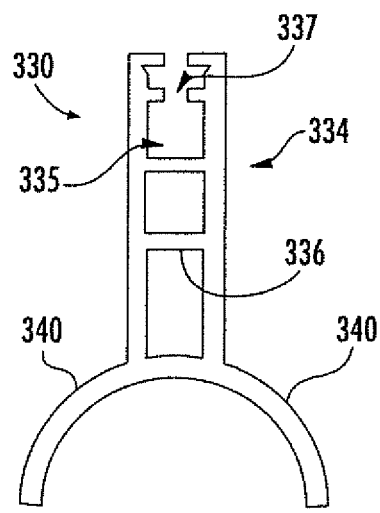
FIGS. 21 and 22 are side views of further exemplary bracket embodiments including various base profiles.
Figure 22:
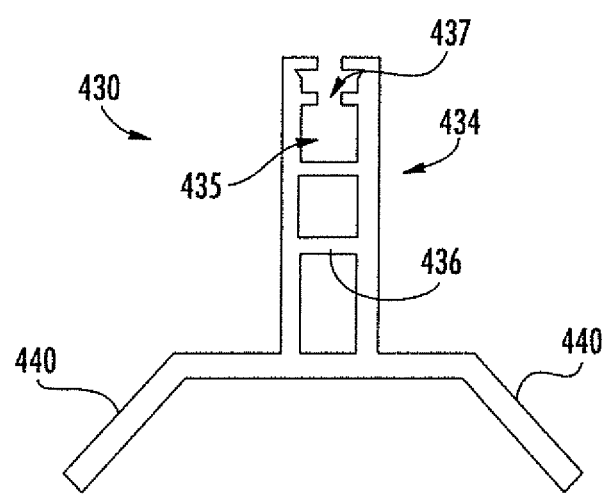

Furthermore, the base may have different non-linear profiles in different embodiments. Referring now to FIG. 21, in accordance with another example embodiment of the bracket 330, the flanges 340 of the base define a curved or arcuate shape (i.e., when viewed from the side or cross-section) that may be helpful for installations on corrugated roofs, barrel tile roofs, etc. Another similar example of the bracket 430 is shown in FIG. 22, in which the base has downward pointing wings or flanges 440 which may also be helpful for such three-dimensional (3D) roof types. Other similar 3D profiles for the base may also be used that are appropriate for a given roof type, as will be appreciated by those skilled in the art. As with the above-described embodiments, the brackets 330 and 340 have respective vertical extensions 334, 434, each of which has a respective upper slot 337, 437, and each vertical extension has respective cross-support members 336, 436 defining hollow channels 335, 435 within the vertical extension.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for mounting at least one solar panel on a roof comprising:
    a plurality of bracket fasteners;
    a plurality of panel mounting brackets each comprising
    a base to be positioned on the roof having at least one first opening therein, and
    a vertical extension comprising first and second vertical sidewalls defining a proximal end coupled to the base, a distal end, and a central portion extending between the proximal and distal ends,
    said vertical extension further comprising upper and lower members extending laterally between the vertical sidewalls to define a fastener channel with the vertical sidewalls, and a fastener slot opening extending vertically between the upper and lower lateral members and vertically aligned with the at least one first opening in the base,
    wherein the central portion comprises at least one cross member defining at least one second opening therein vertically aligned with the fastener slot opening and the at least one first opening in the base to guide a respective bracket fastener into and normal to the roof and couple the base with the roof; and
    a plurality of clamps and corresponding clamp fasteners configured to couple the at least one solar panel with the fastener channel of a respective panel mounting bracket so that each clamp fastener is retained within the respective fastener channel and extends vertically upward through the fastener slot opening to the at least one solar panel.

2. The system of claim 1 wherein the at least one first opening comprises a plurality of spaced-apart first openings, wherein the at least one second opening comprises a plurality of second spaced-apart openings.

3. The system of claim 1 wherein the at least one cross member comprises a plurality of cross members vertically spaced apart from one another.

4. The system of claim 1 wherein the at least one first opening comprises a central opening in the base; and wherein the base further defines a plurality of peripheral openings laterally spaced apart from the central opening.

5. The system of claim 1 wherein the base has a non-linear cross section.

6. The system of claim 1 wherein the base has an arcuate cross section.

7. The system of claim 1 wherein the base has a bottom surface to be positioned on the roof; and wherein each bracket further comprises a pad coupled to the bottom surface.

8. A panel mounting bracket for mounting at least one solar panel on a roof, the panel mounting bracket comprising:
    a base to be positioned on the roof having at least one first opening therein; and
    a vertical extension comprising first and second vertical sidewalls defining a proximal end coupled to the base, a distal end, and a central portion extending between the proximal and distal ends;
    said vertical extension further comprising upper and lower members extending laterally between the vertical sidewalls to define a fastener channel with the vertical sidewalls, and a fastener slot opening extending vertically between the upper and lower lateral members and vertically aligned with the at least one first opening in the base,
    wherein the central portion comprises at least one cross member defining at least one second opening therein vertically aligned with the fastener slot opening and the at least one first opening in the base to guide a respective bracket fastener into and normal to the roof and couple the base with the roof;
    wherein the fastener channel is configured to receive a clamp fastener to couple the at least one solar panel with the fastener channel so that the clamp fastener is retained within the fastener channel and extends vertically upward through the fastener slot opening to the at least one solar panel.

9. The panel mounting bracket of claim 8 wherein the at least one first opening comprises a plurality of spaced-apart first openings, wherein the at least one second opening comprises a plurality of second spaced-apart openings.

10. The panel mounting bracket of claim 8 wherein the at least one cross member comprises a plurality of cross members vertically spaced apart from one another.

11. The panel mounting bracket of claim 8 wherein the at least one first opening comprises a central opening in the base; and wherein the base further defines a plurality of peripheral openings laterally spaced apart from the central opening.

12. The panel mounting bracket of claim 8 wherein the base has a non-linear cross section.

13. The panel mounting bracket of claim 8 wherein the base has an arcuate cross section.

14. A method for mounting at least one solar panel on a roof comprising:
    arranging a plurality of panel mounting brackets on the roof and each comprising
    a base positioned on the roof having at least one first opening therein, and
    a vertical extension comprising first and second vertical sidewalls defining a proximal end coupled to the base, a distal end, and a central portion extending between the proximal and distal ends,
    the vertical extension further comprising upper and lower members extending laterally between the vertical sidewalls to define a fastener channel with the vertical sidewalls, and a fastener slot opening extending vertically between the upper and lower lateral members and vertically aligned with the at least one first opening in the base, wherein the central portion comprises at least one cross member defining at least one second opening therein vertically aligned with the fastener slot opening and the at least one first opening in the base to guide a respective bracket fastener into and normal to the roof and couple the base with the roof;

inserting the respective bracket fastener through the fastener slot opening, the at least one second opening, and the at least one first opening of a respective panel mounting bracket normal to the roof and coupling the base of the bracket fastener to the roof; and coupling a plurality of clamps and corresponding clamp fasteners to the at least one solar panel so that each fastener is retained within the respective fastener channel and extends vertically upward through the fastener slot opening to the at least one solar panel.

15. The method of claim 14 wherein the at least one first opening comprises a plurality of spaced-apart first openings, wherein the at least one second opening comprises a plurality of second spaced-apart openings.

16. The method of claim 14 wherein the at least one cross member comprises a plurality of cross members vertically spaced apart from one another.

17. The method of claim 14 wherein the at least one first opening comprises a central opening in the base; and wherein the base further defines a plurality of peripheral openings laterally spaced apart from the central opening.

18. The method of claim 14 wherein the base has a non-linear cross section.

19. The method of claim 14 wherein the base has an arcuate cross section.

20. The method of claim 14 wherein the base has a bottom surface to be positioned on the roof; and wherein each bracket further comprises a pad coupled to the bottom surface.

* * * * *